United States Patent
Kim et al.

(10) Patent No.: US 9,578,669 B2
(45) Date of Patent: Feb. 21, 2017

(54) PAIRING APPARATUS AND METHOD THEREOF

(71) Applicant: SAMSUNG ELECTRONICS CO., LTD., Suwon-si (KR)

(72) Inventors: Tae-hoon Kim, Suwon-si (KR); Scott Seongwook Lee, Suwon-si (KR); Young-hoon Cho, Suwon-si (KR); Tae-hyeun Ha, Suwon-si (KR); Byeong-cheol Hyeon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/740,991

(22) Filed: Jun. 16, 2015

(65) Prior Publication Data

US 2016/0119962 A1    Apr. 28, 2016

(30) Foreign Application Priority Data

Oct. 22, 2014    (KR) .................. 10-2014-0143168

(51) Int. Cl.
*H04B 7/00*    (2006.01)
*H04W 76/02*    (2009.01)
(Continued)

(52) U.S. Cl.
CPC ........... *H04W 76/023* (2013.01); *H04W 8/005* (2013.01); *H04W 4/008* (2013.01); *H04W 88/02* (2013.01)

(58) Field of Classification Search
CPC .... H04W 76/023; H04W 4/008; H04W 88/02; H04W 84/18; H04W 88/06; H04W 76/02; H04W 4/02; H04W 92/02; H04M 1/7253; H04M 2250/02

(Continued)

(56) References Cited

U.S. PATENT DOCUMENTS

2007/0123165 A1\* 5/2007 Sheynman .......... H04M 1/7253
455/41.2
2010/0081376 A1\* 4/2010 Emura .................. H04W 24/00
455/41.1
(Continued)

FOREIGN PATENT DOCUMENTS

EP    2 597 865 A1    5/2013

OTHER PUBLICATIONS

Communication dated Mar. 9, 2016 issued by European Patent Office in counterpart European Patent Application No. 15189845.9.

*Primary Examiner* — Nhan Le
(74) *Attorney, Agent, or Firm* — Sughrue Mion, PLLC

(57) ABSTRACT

A pairing apparatus and method are provided. The pairing apparatus includes: a first communicator configured to broadcast a search signal over a first communication method, and to receive, from the external communication apparatus, a first response signal in response to the search signal; a second communicator configured to receive a second response signal via a second communication method having a shorter transmission range than the first communication method; and a controller configured to, in response to the first communicator receiving the first response signal and the second communicator receiving the second response signal, control to perform a pairing with the external communication apparatus, wherein the second communicator is periodically activated while the pairing apparatus is turned on, and an activation period of the second communicator is set adaptively according to a transmission period of the second response signal.

19 Claims, 12 Drawing Sheets

(51) Int. Cl.
*H04W 8/00* (2009.01)
*H04W 4/00* (2009.01)
*H04W 88/02* (2009.01)

(58) Field of Classification Search
USPC .................. 455/41.2, 418–420, 421, 432.1, 435.1, 455/456.1
See application file for complete search history.

(56) References Cited

U.S. PATENT DOCUMENTS

| | | | |
|---|---|---|---|
| 2010/0304674 A1* | 12/2010 | Kim | H04W 76/02 455/41.2 |
| 2011/0117845 A1 | 5/2011 | Kirsch et al. | |
| 2012/0128154 A1 | 5/2012 | Ran | |
| 2012/0295638 A1* | 11/2012 | Yamauchi | H04M 1/7253 455/456.1 |
| 2013/0189925 A1 | 7/2013 | Staskawicz et al. | |

* cited by examiner

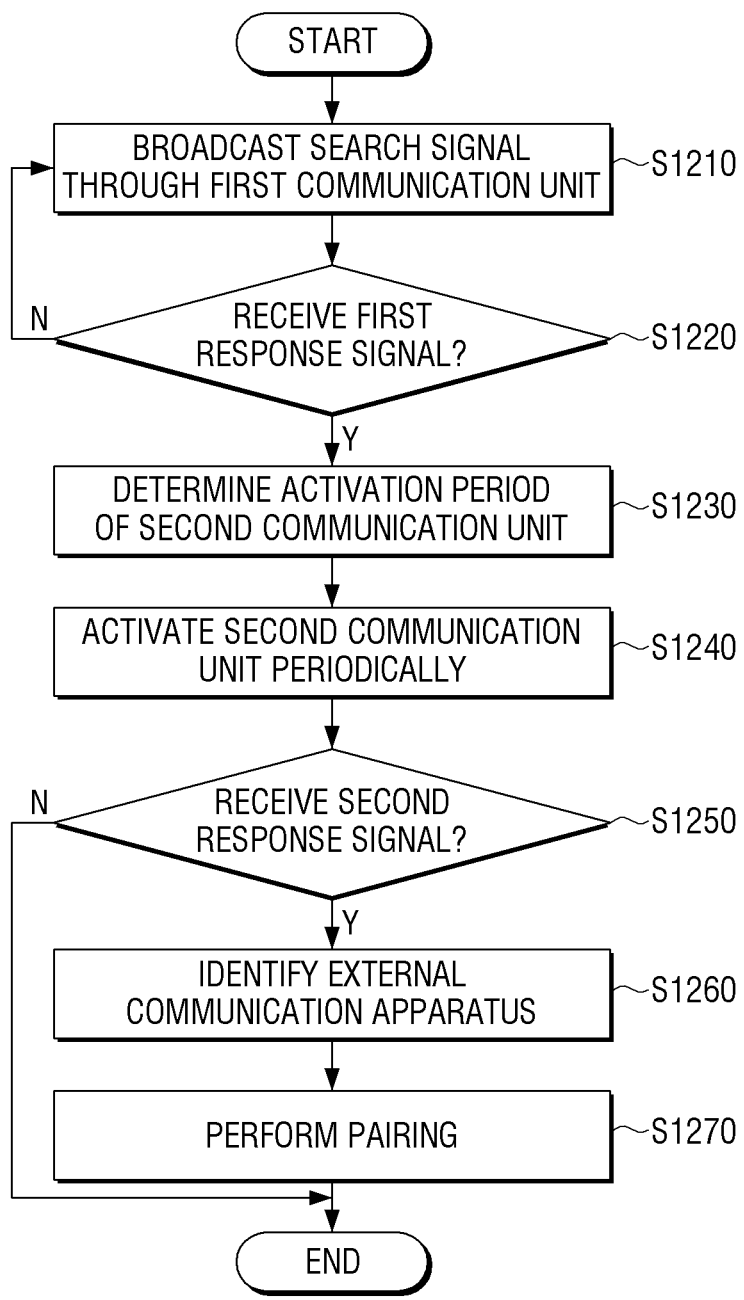

PAIRING APPARATUS AND METHOD THEREOF

CROSS-REFERENCE TO RELATED APPLICATION

This application claims priority from Korean Patent Application No. 10-2014-0143168, filed on Oct. 22, 2014 in the Korean Intellectual Property Office, the disclosure of which is incorporated herein by reference in its entirety.

BACKGROUND

1. Field

Methods and apparatuses consistent with exemplary embodiments relate to a pairing apparatus and a method thereof, and more particularly, to a pairing apparatus capable of performing a pairing by minimizing a user's intervention and a method thereof.

2. Description of the Related Art

As technologies using a wireless apparatus or a wireless link with low cost and low power become more popular, various technologies related to wireless communication have been developed and realized.

However, unlike a wired communication, a wireless communication needs to connect a new wireless communication apparatus to a communication network as a frequency of use increases.

However, a radio frequency (RF) signal for pairing is conveyed over a considerably wide range due to its character, and thus, a wireless communication apparatus that the user does not want to connect to a network may be connected randomly. For example, when a user in a house performs an RF communication to find another communication apparatus capable of pairing with a terminal apparatus that the user possesses, a wireless communication apparatus that the user does not wish to perform a pairing with may be paired.

Accordingly, when a user is not familiar with an operation of a pairing apparatus and does not correctly select a communication apparatus that the user wishes to select among surrounding communication apparatuses searched through a terminal apparatus that the user possesses, pairing for an RF communication of the terminal apparatus is inconvenient and time-consuming.

Accordingly, a method for minimizing a user's intervention, determining a subject to be connected by pairing from a subject not to be connected, and filtering a pairing connection with an apparatus that the user does not wish is required.

SUMMARY

Aspects of one or more exemplary embodiments provide a pairing apparatus capable of automatically finding communication apparatuses that are included within a limited location and of performing a pairing.

According to an aspect of an exemplary embodiment, there is provided a method for pairing a pairing apparatus including a first communicator and a second communicator, the method including: broadcasting, through the first communicator of the pairing apparatus, a search signal for pairing of the pairing apparatus and an external communication apparatus over a first communication method, and periodically activating the second communicator of the pairing apparatus while the pairing apparatus is turned on; and in response to the first communicator receiving, from the external communication apparatus, a first response signal regarding the search signal, and the second communicator receiving, from the external communication apparatus, a second response signal via a second communication method having a shorter transmission range than the first communication method, performing a pairing with the external communication apparatus, wherein an activation period of the second communicator is set adaptively according to a transmission period of the second response signal so that at least one time period when the second communicator is activated overlaps with a time period when the second response signal is transmitted.

The second response signal may include apparatus identification information regarding the external communication apparatus, the pairing may be performed according to the apparatus identification information, and the apparatus identification information may include at least one of a personal identification number (PIN), a device identifier (ID), a universally unique identifier (UUID), and media access control (MAC) address information.

The first communication method of the first communicator may be different from the second communication method of the second communicator.

The first communication method may be a radio frequency (RF) communication method, the pairing may be performed by the RF communication method, the search signal and the first response signal may be transmitted according to the RF communication method, and the second communication method may be one of an ultrasonic wave method, a sound wave method, an infrared ray (IR) method, a visible light method, and a near field communication (NFC) method.

The performing the pairing may include: in response to a plurality of external communication apparatuses transmitting second response signals in response to the broadcast search signal, outputting, for display, information regarding the plurality of external communication apparatuses; and in response to a selection of an external communication apparatus from among the output information, performing the pairing with the selected external communication apparatus.

The first response signal may include transmission period information of the second response signal, and the activation period of the second communicator may be set based on the transmission period information of the second response signal included in the first response signal.

The activation period of the second communicator may be set based on a signal transmission period of the external communication apparatus and may be pre-stored in the pairing apparatus.

The activation period of the second communicator may be set adaptively to have a Coprime relation with the transmission period of the second response signal.

The method may further include, in response to the first communicator receiving, from the external communication apparatus, the first response signal, and the second communicator not receiving, from the external communication apparatus, the second response signal, determining not to perform the pairing with the external communication apparatus.

According to an aspect of another exemplary embodiment, there is provided a pairing apparatus, including: a first communicator configured to broadcast a search signal for pairing the pairing apparatus with an external communication apparatus over a first communication method, and to receive, from the external communication apparatus, a first response signal in response to the search signal; a second communicator configured to receive a second response signal via a second communication method having a shorter transmission range than the first communication method; and a controller configured to, in response to the first communicator receiving the first response signal and the second communicator receiving the second response signal from the external communication apparatus, control to perform a pairing with the external communication apparatus, wherein the second communicator is periodically activated while the pairing apparatus is turned on, and an activation period of the second communicator is set adaptively according to a transmission period of the second response signal so that at least one time period when the second communicator is activated overlaps with a time period when the second response signal is transmitted.

The second response signal may include apparatus identification information regarding the external communication apparatus, the pairing may be performed according to the apparatus identification information, and the apparatus identification information may include at least one of a PIN number, a device ID, a UUID, and MAC address information.

The first communicator may be configured to broadcast the search signal and receive the first response signal over the first communication method which is different from the second communication method of the second communicator.

The first communication method may be an RF communication method, the pairing may be performed by the RF communication method, the search signal and the first response signal may be transmitted according to the RF communication method, and the second communication method may be one of an ultrasonic wave method, a sound wave method, an IR method, a visible light method, and an NFC method.

The pairing apparatus may further include: a display configured to, in response to a plurality of external communication apparatuses transmitting second response signals in response to the broadcast search signal, output information regarding the plurality of external communication apparatuses, and the controller may be configured to, in response to a selection of an external communication apparatus from among the output information, perform the pairing with the selected external communication apparatus.

The first response signal may include transmission period information of the second response signal, and the activation period of the second communicator may be set based on the transmission period information of the second response signal included in the first response signal.

Transmission period information of the second response signal may be pre-stored in the pairing apparatus, and the activation period of the second communicator may be set based on the pre-stored transmission period information of the second response signal.

The activation period of the second communicator may be set adaptively to have a Coprime relation with the transmission period of the second response signal.

According to an aspect of another exemplary embodiment, there is provided a communication apparatus, including: a first communicator configured to receive, from an external pairing apparatus, a broadcast search signal for pairing the pairing apparatus with the communication apparatus over a first communication method, and to transmit, to the pairing apparatus in response to the received search signal, a first response signal via the first communication method; and a second communicator configured to transmit, in response to the received search signal, a second response signal via a second communication method having a shorter transmission range than the first communication method.

The first response signal may include transmission period information of the second response signal.

The second response signal may include apparatus identification information regarding the communication apparatus, the pairing is performed according to the apparatus identification information, and the apparatus identification information may include at least one of a personal identification number (PIN), a device identifier (ID), a universally unique identifier (UUID), and media access control (MAC) address information.

According to aspects of one or more exemplary embodiments, a pairing connection with an apparatus that the user does not want to pair with is filtered automatically while a user's intervention is minimized, and the convenience of a user is improved.

BRIEF DESCRIPTION OF THE DRAWINGS

These and/or other aspects will become apparent and more readily appreciated from the following description of exemplary embodiments, taken in conjunction with the accompanying drawings in which:

FIGS. 11 to 12 are flowcharts illustrating a pairing method of a pairing apparatus according to one or more other exemplary embodiments.

DETAILED DESCRIPTION OF EXEMPLARY EMBODIMENTS

Figure 1:
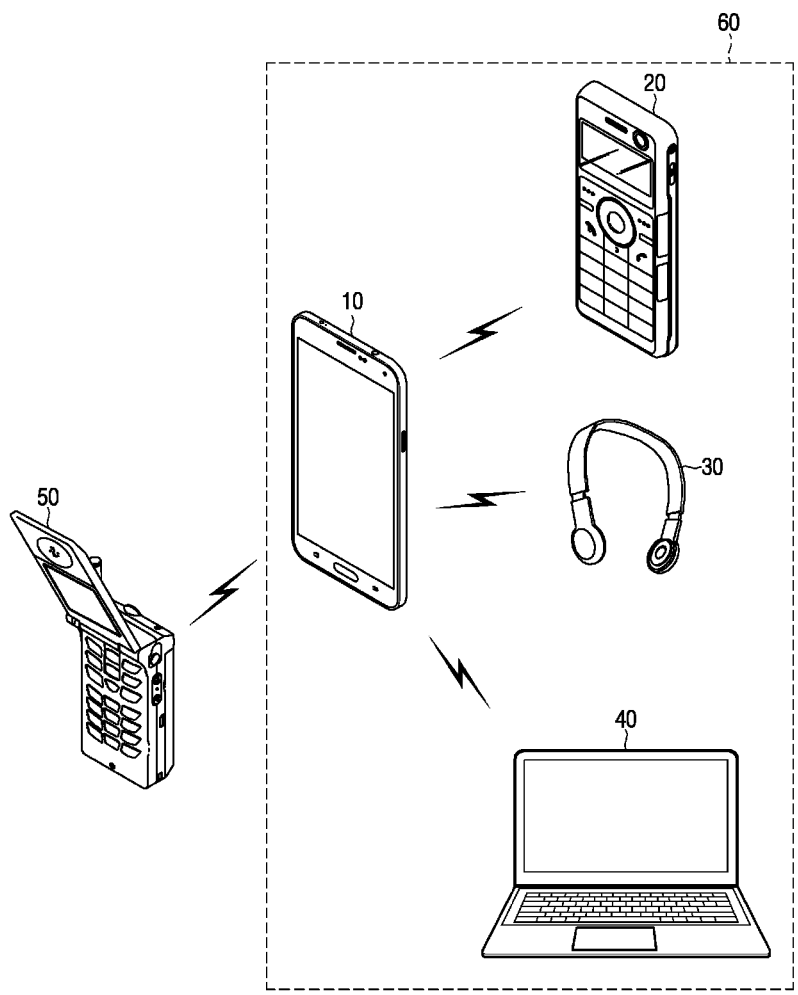
FIG. 1. is a view illustrating a state in which a pairing apparatus and an external communication apparatus are paired according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

FIG. 1 is a view illustrating a state in which a pairing apparatus and an external communication apparatus are paired according to an exemplary embodiment.

Referring to FIG. 1, a pairing apparatus and an external communication apparatus included may include a portable terminal apparatus, a personal digital assistant (PDA), a notebook computer, a tablet computer, a personal computer (PC), a smart device, a wearable smart device, a mobile phone, a portable multimedia player, a smart appliance, a display device, a broadcast receiving apparatus, and the like. Hereinafter, a pairing apparatus may be an apparatus which is able to be connected to and perform a pairing with an external apparatus capable of performing a communication. Hereinafter, a pairing apparatus is described as a portable terminal apparatus for convenience of explanation, though it is understood that one or more other exemplary embodiments are not limited thereto. As illustrated in FIG. 1, by way of example, a pairing apparatus may be a portable terminal apparatus 10, and an external communication apparatus connected to the portable terminal apparatus 10 may be a PDA 20, a headphone 30, a notebook computer 40, a portable terminal apparatus 50, or the like. An apparatus capable of pairing may be implemented as a pairing apparatus or a communication apparatus according to various exemplary embodiments.

A pairing between apparatuses may be performed using a radio frequency (RF) method, such as a Zigbee communication method, a Bluetooth communication method and the like.

For example, the following process may be performed to accomplish a pairing through an RF method. A portable terminal apparatus 10 transmits, to an external communication apparatus, an RF signal that requests a pairing (e.g., an RF signal including pairing request information). External communication apparatuses capable of receiving pairing request information from the portable terminal apparatus 10 may be the PDA 20, the headphone 30, the notebook PC 40, the portable terminal apparatus 50, etc. In response to receiving the pairing request information, an external communication apparatus transmits personal identification number (PIN) code request information to the portable terminal apparatus 10 to perform a pairing with the portable terminal apparatus 10. Accordingly, a PIN code is inputted to the portable terminal apparatus 10 by a user, and the inputted PIN code is transmitted to the external communication apparatus. Then, the external communication apparatus checks whether the received PIN code corresponds to its own PIN code. If the received PIN code does not correspond to its own PIN code, the external communication apparatus re-transmits PIN code request information to the portable terminal apparatus 10. If the PIN code corresponds to its own PIN code, the external communication apparatus performs a pairing with the portable terminal apparatus 10.

However, this method may be time-consuming and inconvenient because a pairing setting should be re-performed when a user is not familiar with a method for setting a pairing or when incorrect information is inputted in a step of setting a pairing. Accordingly, a technology of automatically performing a pairing with a communication apparatus capable of pairing with an operation of turning on a pairing without inputting a PIN code, which is called a smart pairing technology, may be used. However, in this case of an automatic pairing, an external communication apparatus that the user does not wish to connect to may nonetheless be connected to and a pairing may be performed due to the character of an RF signal transmitted in a wide range without a spatial limitation.

For example, a user may selectively perform a pairing with the PDA 20, the headphone 30, and the notebook PC 40 in a certain location 60 in a house using the portable terminal apparatus 10. Herein, when a user tries to perform a pairing connection with the notebook PC 40, the pairing connection between the portable terminal apparatus 10 and the notebook PC 40 may be performed by turning on a pairing setting of the notebook PC 40. However, when a pairing setting of the portable terminal apparatus 50 in another location (e.g., another person's house that is outside of the house) is turned on, a pairing with the portable terminal apparatus 50 that the user does not wish to connect to may be performed, as illustrated in FIG. 2.

Figure 2:
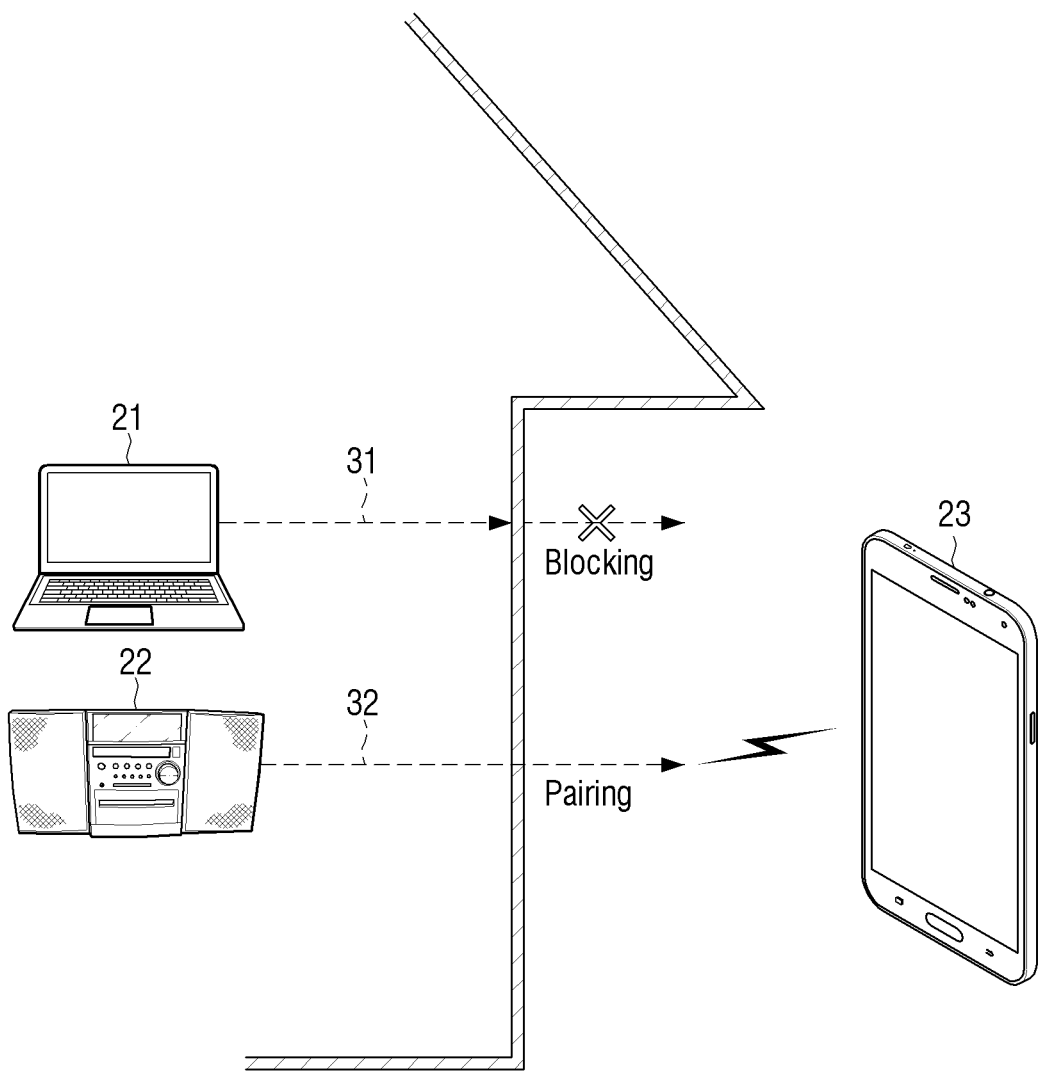
FIG. 2 is a view illustrating a character of an RF signal for pairing according to an exemplary embodiment.

Referring to FIG. 2, the notebook PC 21 in a house may transmit a signal 31 of an ultrasonic wave, a sound wave, an infrared (IR) wave, a visible light, or a near field communication (NFC) to communicate with a portable terminal apparatus 23 on the outside of a house. The aforementioned signals are signals capable of communicating in a limited location, and thus, the signals are not able to pass a wall which is a boundary between a house and the outside of a house. Accordingly, a connection with the portable terminal apparatus 23 on the outside of a house may be limited or prevented.

An audio equipment 22 in a house may transmit an RF signal 32 for performing a pairing with the portable terminal apparatus 23 on the outside of a house. In this case, due to the character of the RF signal which covers a considerably wider range without a spatial limitation, the RF signal is able to pass a wall that is a boundary between a house and the outside of a house, and thus it is possible to perform a pairing connection with the portable terminal apparatus 23 on the outside of the house. That is, a pairing connection between the audio equipment 22 in the house and the portable terminal device 23 on the outside of the house, which is in an area of another user, may be performed automatically.

Accordingly, a problem such as a waste of energy consumption, an exposure of privacy, a danger of security, and the like may occur. To resolve aforementioned problems, aspects of one or more exemplary embodiments provide a pairing apparatus capable of filtering a connection with a communication apparatus that a user does not wish to connect to, and a method thereof.

Figure 3:
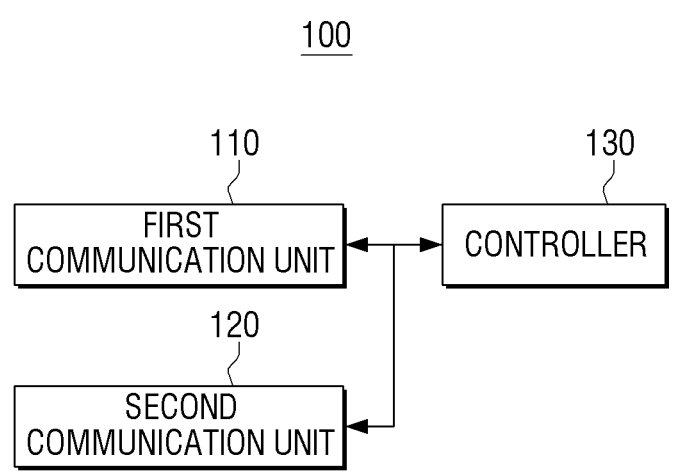
FIG. 3 is a block diagram simply illustrating a configuration of a pairing apparatus according to an exemplary embodiment.

FIG. 3 is a block diagram simply illustrating a configuration of a pairing apparatus 100 according to an exemplary embodiment.

Referring to FIG. 3, a pairing apparatus 100 according to an exemplary embodiment includes a first communication unit 110 (e.g., first communicator), a second communication unit 120 (e.g., second communicator), and a controller 130.

The first communication unit 110 is configured to perform a communication by an RF communication method. The first communication unit 110 may perform a series of operations for receiving and transmitting data through a wireless interface with external communication apparatuses capable of a short-distance wireless communication. To be specific, the first communication unit 110 may receive multimedia data transmitted from external communication apparatuses capable of short-distance wireless communication, and convey or provide the received multimedia data to the controller 130.

An RF communication method may include a Bluetooth communication, a Zigbee communication, a binary code division multiple access (CDMA) or high frequency/low frequency communication method, and the like. While a Bluetooth communication method is implemented in one or more exemplary embodiments described herein, it is understood that one or more other exemplary embodiments are not limited thereto, and any communication method capable of performing a pairing using an RF signal can be used.

A Bluetooth communication method performs a communication using an industrial scientific medical (ISM) in 2.4 GHz band. An ISM band may be used freely without an additional license. Also, the Bluetooth communication method has a guard band that is below 2 MHz band from the ISM band and above 3.5 MHz band from the ISM band, so that an interference of another apparatus is prevented or minimized. The Bluetooth communication method uses a frequency hopping method and may perform a hopping 1600 times in a second.

The first communication unit 110 may broadcast a search signal for a pairing of the RF communication method, and receive a first response signal in response to the search signal from an external communication apparatus. The search signal and the first response signal are signals of the RF communication method. To be specific, while the pairing apparatus is turned on, or a setting for performing a pairing is turned on or activated, the first communication unit 110 may broadcast a search signal for searching for an external communication apparatus that is located around the pairing apparatus 100. The external communication apparatus corresponds to another pairing apparatus which is capable of performing a pairing. In this case, while the external communication apparatus is able to perform a pairing, the first communication unit 110 may receive a transmitted search signal, transmitted from the external communication apparatus.

The second communication unit 120 is configured to determine whether an external communication apparatus is located in a limited location. The second communication unit 120 may be configured to transmit and/or receive a signal that is able to be communicated over a limited location or distance (e.g., an ultrasonic wave, a sound wave, an IR wave, an NFC signal, and the like). Accordingly, the pairing apparatus 100 can determine whether an external communication apparatus is located in the limited location. That is, a communication method of the search signal and the first response signal transmitted and received by the first communication unit 110 and a communication method of the second response signal received by the second communication unit 120 may be different from each other. In this regard, the transmission distance of a signal according to the communication method (i.e., first communication method) of the first communication unit 110 may be greater than the transmission distance of a signal according to the communication method (i.e., second communication method) of the second communication unit 120.

When an external communication apparatus receives a search signal transmitted from the first communication unit 110, the external communication apparatus transmits the first response signal to the pairing apparatus 100, and the first communication unit 110 of the pairing unit 100 receives the first response signal. The external communication apparatus may transmit the second response signal along with or separately from the first response signal, and the second communication unit 120 may receive the second response signal. Here, the second response signal may be transmitted in response to the search signal or a different (e.g., subsequent) search signal. The second response signal is transmitted over a location having a limited distance from the location of the external communication apparatus. Thus, the second response signal may be received only when the pairing apparatus 100 is located in a location proximate to the external communication apparatus. Furthermore, the pairing apparatus 100 may perform a pairing with the external communication apparatus only when the second communication unit 120 receives the second response signal.

The second communication unit 120 may be periodically activated while the pairing apparatus 100 is turned on, and the second response signal may be received while the second communication unit 120 is activated. An activation period of the second communication unit 120 may be adaptively set according to a transmission frequency of the second response signal, and at least one section (e.g., time period) where the second communication unit is activated may overlap with a section where the second response signal is transmitted.

Specifically, the second communication unit 120 may be activated according to a predetermined period. Herein, an activation represents a state of providing power to the second communication unit 120. That is, power may be repeatedly provided to and cut off from the second communication unit 120 with a predetermined period. Accordingly, the second communication unit 120 may receive the second response signal only when the second communication unit 120 is activated, that is, only when the second communication apparatus 120 is powered, i.e., during a period where the power is provided. Herein, an activation period of the second communication unit 120 may be adaptively set according to a transmission period of the second response signal. That is, considering a transmission period of the second response signal, when the second response signal is transmitted, the period may be set to activate the second communication unit 120 so that the second communication unit 120 is able to receive the second response signal.

The pairing apparatus 100 may pre-store transmission period information of the second response signal to set an activation period considering a transmission period of the second response signal. The transmission period information may be recorded in a storage or memory during a manufacturing process of the pairing apparatus 100. Also, transmission period information of the second response signal may be included in the first response signal. An external communication apparatus may transmit the first response signal to the pairing apparatus 100, and also may include transmission period information of the second response signal in a packet of the first response signal. Accordingly, the pairing apparatus 100 may set an activation period of the second communication unit 120 using the transmission period information of the second response signal included in the first response signal. According to another exemplary embodiment, the pairing apparatus 100 may determine the transmission period information according to a transmission time of the search signal (e.g., determine to provide power to the second communication unit 120 during a predetermined time period after the transmitting of the search signal). According to still another example, the pairing apparatus 100 may determine the transmission period information according to at least one of a receiving time and a transmitting time of the first response signal (e.g., determine to provide power to the second communication unit 120 during a predetermined time period after the receiving of the first response signal or based on a difference between a transmitting time and a receiving time of the first response signal). According to yet another example, the pairing apparatus 100 may determine the transmission period information according to at least one of a transmitting time of the search signal and a receiving time of the first response signal (e.g., determine to provide power to the second communication unit 120 during a predetermined time period based on a difference between the transmitting time and the receiving time).

An activation period of the second communication unit 120 may be set to be a Coprime relation with a transmission period of the second response signal. Coprime represents two integers in a case where common denominators between the two integers are only 1 and −1. Since there is no other common denominators, a section where the second communication unit 120 is activated should be overlapped with a section where the second response signal is transmitted. For example, when an activation period of the second communication unit 120 and a transmission period of the second response signal are not Coprime, the second communication unit 120 may have a period of 200 ms and the second response signal may have a transmission period of 100 ms. In this case, the second communication unit 120 may be activated in a section (e.g., time period) where the second response signal is not transmitted. Accordingly, even if the second communication unit 120 is activated periodically, the second response signal may not be received, resulting in an unstable communication operation.

When an activation period of the second communication unit 120 is random, there may be an overlap between a section where the second communication unit 120 is activated and a section where the second response signal is transmitted. Accordingly, the second communication unit 120 may be activated by a random function.

Figure 5:
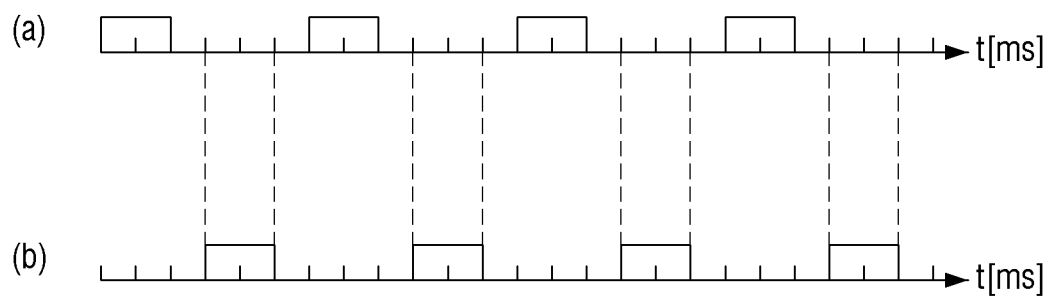
FIGS. 5 to 6 are views illustrating a relation between a transmission frequency of the second response signal and an activation frequency of the second communication unit according to an exemplary embodiment.
Figure 6:
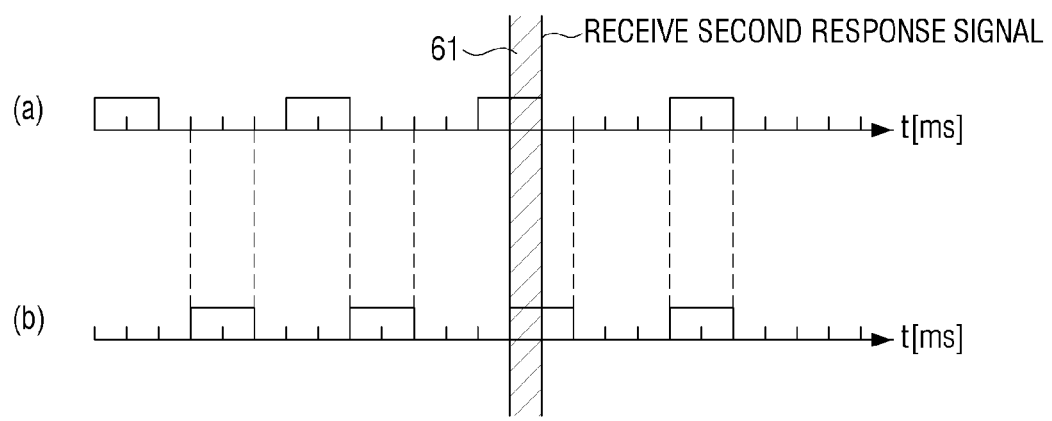

Referring to FIGS. 5 and 6, a relation between an activation period of the second communication unit 120 and a transmission period of the second response signal is explained in detail.

The controller 130 controls an overall operation of the pairing apparatus 100.

In particular, the controller 130 determines whether both of the first response signal and the second respond signal are received, and controls to perform a pairing with an external communication apparatus if both of the first response signal and the second response signal are received. Also, the controller 130 may adaptively set an activation period of the second communication unit 120 according to a transmission period of the second response signal so that at least one section of the section where the second communication unit 120 is activated may overlap with a section where the second response signal is transmitted. Specifically, the controller 130 may analyze transmission period information of the second response signal that is included in the first response signal or pre-stored in a memory of the pairing apparatus, and set an activation period of the second communication unit 120 accordingly.

The controller 130 may control a period of providing and cutting off power to the second communication unit 120 according to an adaptively set activation period as described above. Accordingly, a pairing may be performed by receiving the second response signal without continually providing the power to the second communication unit 120 so that the power consumed in the second communication unit 120 may be reduced.

Figure 4:
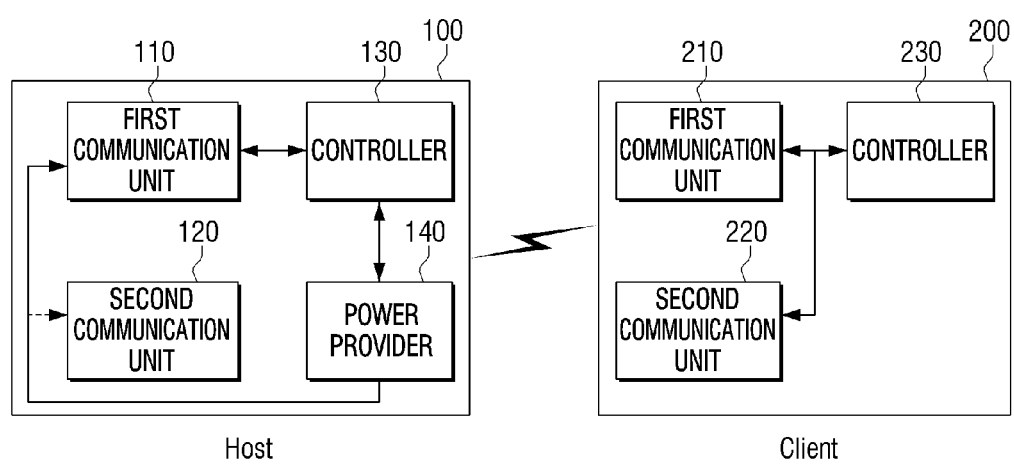
FIG. 4 is a block diagram simply illustrating a pairing system including a pairing apparatus and an external communication apparatus according to an exemplary embodiment.

FIG. 4 is a block diagram illustrating a pairing system including a pairing apparatus 100 and an external communication apparatus 200 according to an exemplary embodiment.

Referring to FIG. 4, the pairing apparatus 100 includes the first communication unit 110 (e.g., first communicator), the second communication unit 120 (e.g., second communicator), the controller 130, and the power provider 140. An external communication apparatus 200 which communicates with the pairing apparatus 100 includes a first communication unit 210 (e.g., first communicator), a second communication unit 220 (e.g., second communicator), and a controller 230.

The first communication unit 110 of the pairing apparatus 100 and the first communication unit 210 of the external communication apparatus 200 are configured to perform a pairing by a first communication method (e.g., an RF communication method). If the first communication unit 110 of the pairing apparatus 100 broadcasts a search signal, the first communication unit 210 of the external communication apparatus 200 may receive the broadcast search signal, and may transmit a first response signal that notifies a receipt of the search signal to the first communication unit 110 of the pairing apparatus 100 by a control of the controller 230. Herein, the first response signal may include transmission period information of the second response signal although, as described above, one or more other exemplary embodiments are not limited thereto.

The second communication unit 120 of the pairing apparatus 100 and the second communication unit 220 of the external communication apparatus 200 are configured to determine whether the pairing apparatus 100 and the external communication apparatus 200 are located in the same location by a second communication method (e.g., an ultrasonic wave method, a sound wave method, an IR method, a visible light method, and an NFC method). Here, the second communication method may have a shorter transmission range than the first communication method. If the second communication unit 220 of the external communication apparatus 200 transmits a second response signal to the pairing apparatus 100 by a control of the controller 230, the second communication unit 120 of the pairing apparatus 100 may receive the second response signal. Here, if the second communication unit 120 receives the second response signal, the pairing apparatus 100 and the external communication apparatus 200 perform a pairing with each other. The controller 130 may control the second communication unit 120 to adaptively set an activation period of the second communication unit 120 according to a transmission period of the second response signal so that the second communication unit 120 may receive the second response signal. Specifically, the controller 120 may control the power provider 140 so as to provide power to the second communication unit 120 at a regular period, so that an activation period of the second communication unit 120 may be controlled.

The external communication apparatus 200 may include apparatus identification information regarding the external communication apparatus 200 in the second response signal, and transmit the second response signal to the pairing apparatus 100. Accordingly, a pairing between the pairing apparatus 100 and the external communication apparatus may be performed according to the apparatus identification information. Apparatus identification information may include at least one of address information for the pairing apparatus 100 to find and perform pairing with the external communication apparatus 200 and information regarding a connection. Also, apparatus identification information may include a PIN number, a device identifier (ID), a universal unique identifier (UUID), media access control (MAC) address information and the like. Furthermore, according to one or more exemplary embodiments, the controller 230 may control so that power is provided to the second communication unit 220 at a predetermined period, e.g., in response to the first communication unit 210 receiving the search signal.

FIGS. 5 and 6 are views illustrating a relation between a transmission period of the second response signal and an activation period of the second communication unit 120 according to an exemplary embodiment.

FIG. 5 is an example where the second communication unit 120 is activated so that the second response signal is not received. In FIG. 5(*a*), the second response signal that is transmitted by a transmission period of 6 ms is illustrated. In FIG. 5(*b*), an activation period of the second communication unit 120 with a period of 6 ms that is identical to a transmission period of the second response signal is illustrated.

When a period of the second response signal and an activation period of the second communication unit 120 are identical, as illustrated in FIG. 5, a section where the second response signal is transmitted may be included in a section where the second communication unit 120 is deactivated. Accordingly, the second communication unit 120 may not be able to receive the second response signal even if it is activated with a comparatively short period, and thus, a stable pairing may not be performed.

FIG. 6 is an example where the second communication unit 120 is activated so that the second response signal is received according to an exemplary embodiment. FIG. 6(*a*) is a view illustrating the second response signal that is transmitted with a transmission period of 6 ms, and FIG. 6(*b*) is a view illustrating an activation period of the second communication unit 120 with a transmission period of 5 ms.

A period of the second response signal and an activation period of the second communication unit are 6 ms and 5 ms, respectively, and are in Coprime relation. Accordingly, as illustrated in FIG. 6, a section where the second response signal is transmitted is included in a section where the second communication unit 120 is activated. Accordingly, the first section 61 which is a section where the second response signal is transmitted and a section where the second communication unit 120 is activated are overlapped, becomes a section where the second response signal is received. Accordingly, the second communication unit 120 is able to receive the second response signal in a relatively short time, and thus a stable pairing may be performed.

Figure 7:
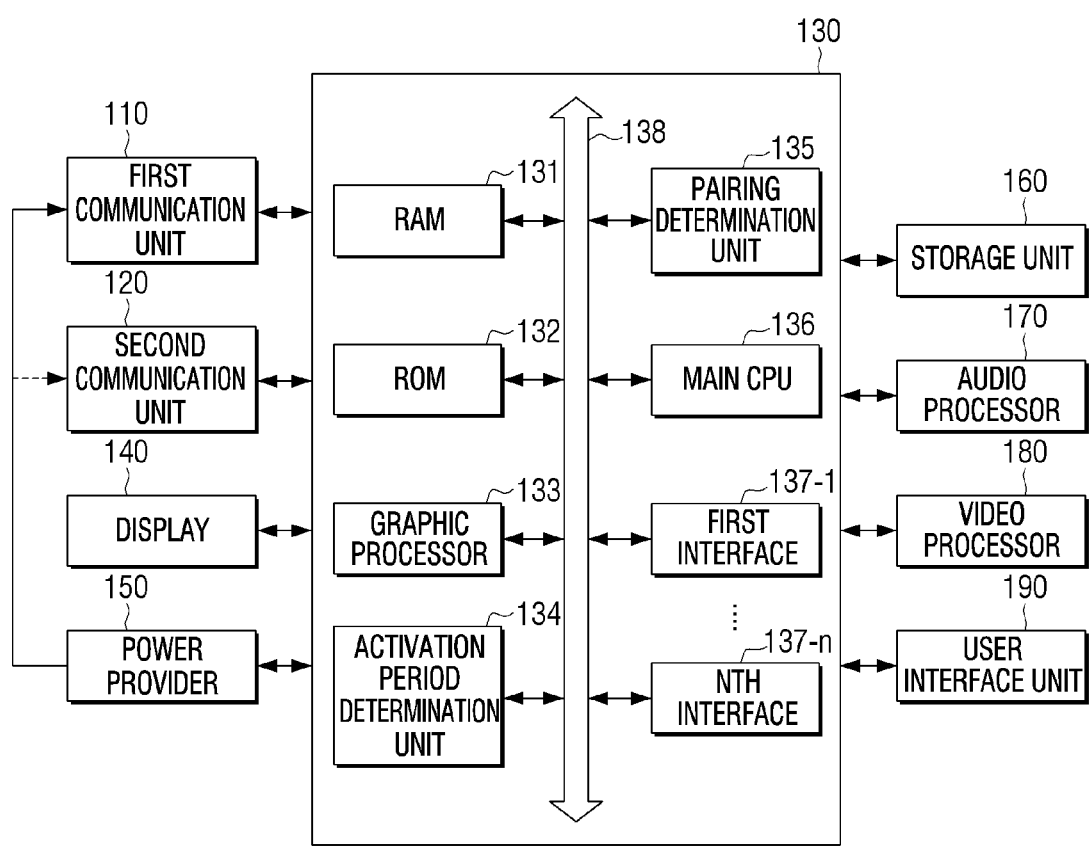
FIG. 7 is a block diagram illustrating a configuration of a pairing apparatus in detail according to another exemplary embodiment.

FIG. 7 is a block diagram illustrating a configuration of a pairing apparatus 100' in detail according to another exemplary embodiment. As illustrated in FIG. 7, a pairing apparatus 100' according to another exemplary embodiment includes the first communication unit 110 (e.g., first communicator), the second communication unit 120 (e.g., second communicator), a controller 130, a display 140, a power provider 150, a storage 160, an audio processor 170, a video processor 180, and a user interface unit 190 (e.g., user interface device or user interface). Hereinafter, explanations redundant with explanations of FIGS. 3 to 4 is omitted below for purposes of convenience.

The display 140 is an element configured to display information regarding an external communication apparatus 200 with which a pairing is performed. The display 140 may display information regarding at least one of a manufacturer, a model name, pairing availability, a pairing history, and the like of the external communication apparatus 200 that may be paired with the pairing apparatus 100' or that is already paired with the pairing apparatus 100'. Furthermore, when there are a plurality of external communication apparatuses that transmit the second response signal, information regarding a plurality of external communication apparatuses may be displayed (e.g., a list of the external communication apparatuses). Accordingly, a user may select one or more than one apparatus among external communication apparatuses displayed on the display 140, and perform a pairing with the one or more selected external communication apparatuses.

The display 140 may be realized as a liquid crystal display (LCD), an organic light emitting diodes (OLED), an active matrix OLED (AMOLED) display, a light emitting diode backlit display, a plasma display, and the like, but it is not limited thereto. Also, the display 140 may be realized as a flexible display, a transparent display, and the like.

The power provider 150 is configured to provide the power to the pairing apparatus 100'. Furthermore, the power provider 150 may provide power for activating the second communication unit 120. The power provider 150 may be an element that is configured to provide the power to the second communication unit 120 only, separately from the power that is provided to a main system of the pairing apparatus 100'.

The power provider 150 may repeatedly perform a providing and disconnecting of the power of the second communication unit 120 according to an activation period of the second communication unit 120. Accordingly, the power provider 150 does not provide the power to the second communication unit 120 continually or at all times so that the power consumed in the second communication unit may be reduced.

The storage 160 may store transmission period information regarding the second response signal of the external communication apparatus 200, and store various modules for driving the pairing apparatus 100'

To be specific, the storage 160 may store a base module which processes a signal transmitted from each of hardware included in the pairing apparatus 100', and a storage module which manages a database (DB) and/or registry, a security module, a communication module, and the like. Furthermore, the storage 160 may store an activation period determination module for determining an activation period of the second communication unit 120.

The audio processor 170 is configured to perform a process with respect to audio data.

The video processor 180 is configured to perform various image processes such as at least one of a decoding regarding a content, a scaling, a noise filtering, a frame rate conversion, a resolution conversion, and the like.

The user interface unit 190 is configured to detect a user interaction for controlling an overall operation of the pairing apparatus 100'. In particular, the user interface 190 may include various interaction detecting apparatuses such as a camera, a microphone, a remote controller signal receiver, a touch screen, one or more physical buttons, and the like.

The controller 130 controls an overall operation of the pairing apparatus 100' using various modules stored in the storage 160.

As illustrated in FIG. 7, a random access memory (RAM) 131, a read only memory (ROM) 132, a graphic processor 133, an activation period determination unit 134 (e.g., activation period determiner), a pairing determination unit 135 (e.g., pairing determiner), a main central processing unit (CPU) 136, first to nth interfaces **137-1~137-*n*, and the like may be connected each other through a bus 138**.

The ROM 131 stores an instruction set for a system booting. The main CPU 136 copies various application programs stored in the storage 160 to the RAM 132, and executes an application program copied to the RAM 132 and performs various operations. Also, transmission period information of the second response signal of an external communication apparatus 200 may be stored in the ROM 131.

The graphic processor 133 generates a screen including various objects such as an icon, an image, a text, and the like using a calculator and a rendering unit (e.g., renderer). The calculator calculates an attribute value such as at least one of a coordinate value, a shape, a size, a color, and the like which will be displayed on each of objects according to a layout of a screen. The rendering unit generates a screen of various layouts including an object based on an attribute value calculated by the calculator.

The activation period determination unit 134 determines an activation period of the second communication unit 120 based on transmission period information of the second response signal, which may be pre-stored in the storage 160 or the ROM 132, or may be based on transmission period information of the second response signal included in the first response signal. An activation period of the second communication unit 120 may be set adaptively to transmission period information of the second response signal, so that a section where the second communication unit 120 is activated may be overlapped with a section where the second response signal is transmitted. As an exemplary embodiment, an activation period of the second communication unit 120 may be set to be a Coprime relation with a transmission period of the second response signal. To determine an activation period of the second communication unit 120, an activation period determination unit may be stored in the storage 160.

The pairing determination unit 135 is configured to determine whether both of the first response signal and the second response signal are received, and to perform a pairing with the external communication unit 200 only when both of the signals are received. When the external communication apparatus 200 and the pairing apparatus 100' are not located in the same location (i.e., within a certain or predetermined distance from each other), the pairing apparatus 100' is not able to receive the second response signal from the external communication apparatus 200, and thus, a pairing connection is not performed.

The main CPU 136 accesses the storage 160, and performs a booting using an operation system (O/S) stored in the storage 160. Also, the main CPU 136 performs various operations using various programs, contents data, and the like stored in the storage 160.

The first to the nth interfaces 135-1 to 135-n are connected to various elements described above. For example, one of the interfaces may be a network interface which is connected to an external apparatus through a network.

Figure 8:
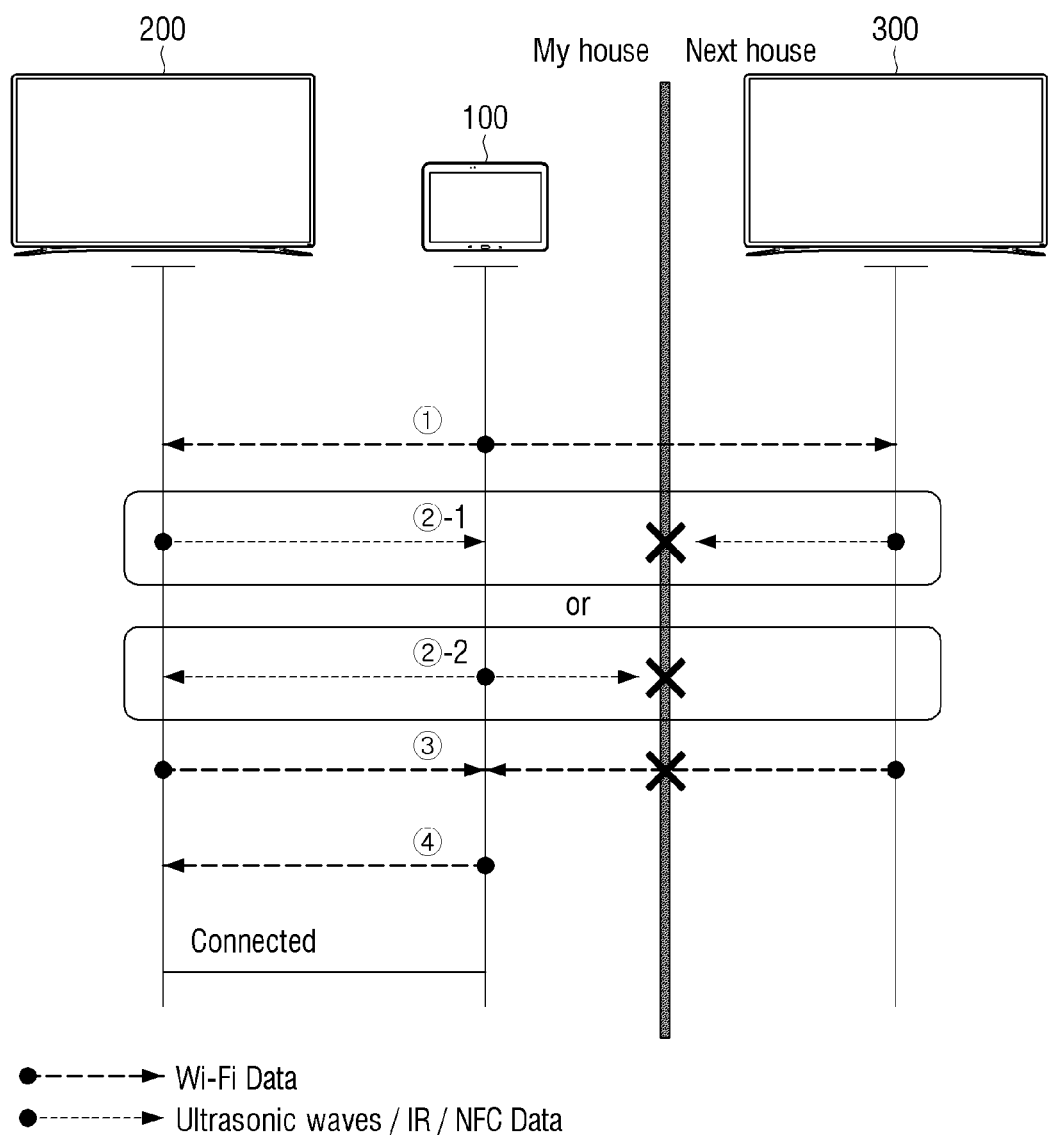
FIG. 8 is a block diagram illustrating a method for filtering a pairing with a communication apparatus outside of a limited location according to an exemplary embodiment.

FIG. 8 is a block diagram illustrating a method for filtering a pairing with a communication apparatus 300 outside of a limited location according to an exemplary embodiment.

The pairing apparatus 100 may broadcast a search signal (①) for searching for an external communication apparatus that is able to perform a pairing through an identical RF communication method. Due to the character of the communication method for transmitting the search signal, the search signal may pass through a wall and be conveyed to a TV 300, which is a subject (e.g., device) not to be connected with, in the next house.

Then, a TV 200, which is a subject to be connected to, and the TV 300 which receive the search signal may transmit the first response signal to the pairing apparatus 100, and transmit the second response signal (②-1) which is able to communicate over a limited location/distance (such as an ultrasonic wave, a sound wave, an IR wave, a visible light, an NFC, etc.). Herein, due to the character of the communication method for transmitting the second response signal, the second response signal does not pass the wall, and thus a response through the second response signal of the TV 300 in the next house may be limited or may not be received by the pairing apparatus 100. Accordingly, the pairing apparatus 100 may determine that the TV 200 which transmits the second respond signal is located in the same location, and may perform a pairing with the TV 200. However, the pairing apparatus 100 may determine that the TV 300 is not located in the same location, and may not perform a pairing. Here, the pairing apparatus 100 may determine that the TV 300 is not to be connected with if the second response signal is not received from the TV 300 or if a characteristic (e.g., signal strength) of the second response signal from the TV 300 is below a threshold value.

Accordingly, the pairing apparatus 100 may receive and transmit Wi-Fi Data (③, ④) with the TV 200, which is connected by a pairing, and may not receive and transmit Wi-Fi Data with the TV 300 in the next house.

According to another exemplary embodiment, the pairing apparatus 100 may broadcast a signal (②-2, hereinafter, a filtering signal) corresponding to the second response signal. In this case, the filtering signal may not pass a wall due to the character of the communication method of the filtering signal, and thus the TV 300 in the next house is not able to receive the filtering signal. Accordingly, only the TV 200 located in the same location is able to receive the filtering signal, and if the TV 200, a subject to be connected, receives the filtering signal, a pairing may be performed.

Figure 9:
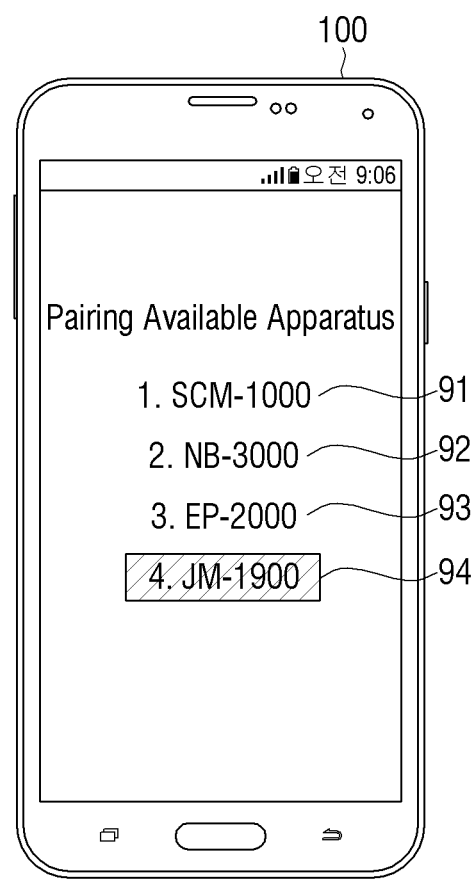
FIG. 9 is a view illustrating a method for displaying and providing an apparatus where a pairing apparatus is able to perform a pairing.

FIG. 9 is a view illustrating a method for displaying and providing a pairing available apparatus by a pairing apparatus 100 according to an exemplary embodiment.

The pairing apparatus 100 may further include a display. If a plurality of external communication apparatuses transmit the second response signal, the display may display information regarding a plurality of external communication apparatuses.

As illustrated in FIG. 9, apparatus information 91 to 94 of the external communication apparatuses which transmitted the second response signal and are able to perform a pairing with the pairing apparatus 100 may be displayed. If a user selects one 94 of the displayed external communication apparatuses, a pairing with the selected external communication apparatus may be performed. That is, the pairing apparatus 100 may automatically perform a pairing connection with one or more of the plurality of external communication apparatuses which transmitted the second response signal, and may perform a pairing connection with an external communication apparatus which is selected by a user through the display among the plurality of external communication apparatuses which transmitted the second response signal.

Figure 10:
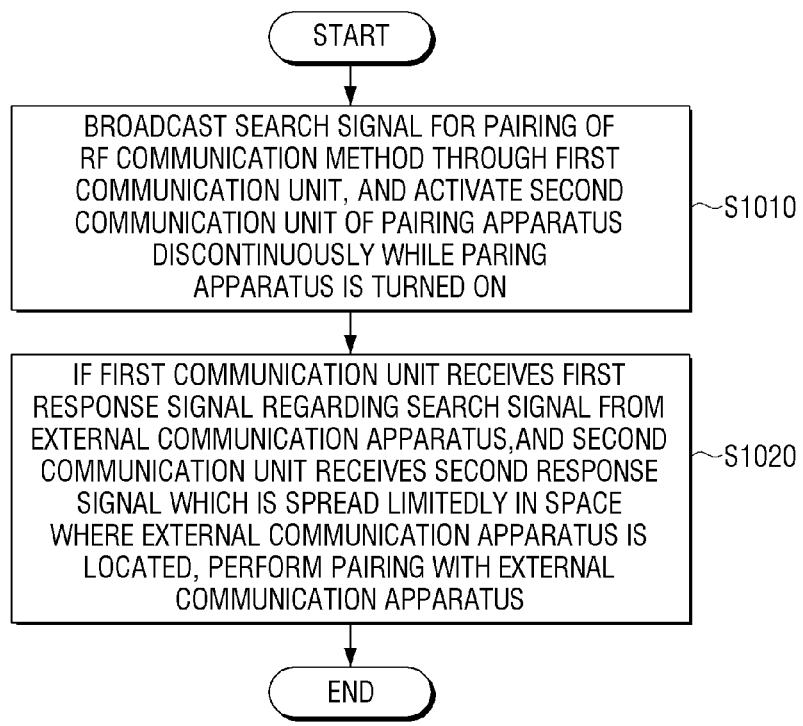
FIG. 10 is a flowchart illustrating a pairing method of a pairing apparatus according to an exemplary embodiment.

FIG. 10 is a flowchart explaining a method for pairing of a pairing apparatus according to an exemplary embodiment.

Referring to FIG. 10, a search signal for a pairing of a first communication method (e.g., an RF communication method) is broadcasted through the first communication unit, and the second communication unit of the pairing apparatus is activated discontinuously while the pairing apparatus is turned on (operation S1010). Herein, an activation period of the second communication unit may be set adaptively according to or considering a transmission period of the second response signal of an external communication apparatus, so that at least one section (e.g., time period or time interval) of the section where the second communication unit is activated may be overlapped with the section where the second response signal is transmitted. For example, the activation period of the second communication unit may be set to be a Coprime relation with a transmission period of the second response signal. In this case, transmission period information of the second response signal of the external communication apparatus may be pre-set in the pairing apparatus 100 during a manufacturing process, may be included in the first response signal and be transmitted, etc. Also, an activation period of the second communication unit may be set randomly by a random function.

Then, if the first communication unit receives the first response signal in response to or regarding a search signal from an external communication apparatus, and the second communication unit receives the second response signal which is conveyed over a limited location relative to where the external communication apparatus is located, a pairing with the external communication apparatus is performed (operation S1020). A pairing is performed by the first communication method (e.g., an RF communication method), and accordingly, a search signal and the first response signal may be a signal transmitted according to the first communication method. However, the second response signal that is communicated over a limited location/distance, may be a signal transmitted according to a second communication method (e.g., a communication method of an ultrasonic wave, a sound wave, an IR wave, a visible light, an NFC, etc.). The second response signal may include apparatus identification information regarding an external communication apparatus, and a pairing with an identified apparatus may be performed. Apparatus identification information may include a PIN number, a device ID, an UUID, MAC address information, and the like. Accordingly, a pairing apparatus performs a pairing with a corresponding external communication apparatus according to apparatus identification information only if both of the first response signal and the second response signal are received.

Figure 11:
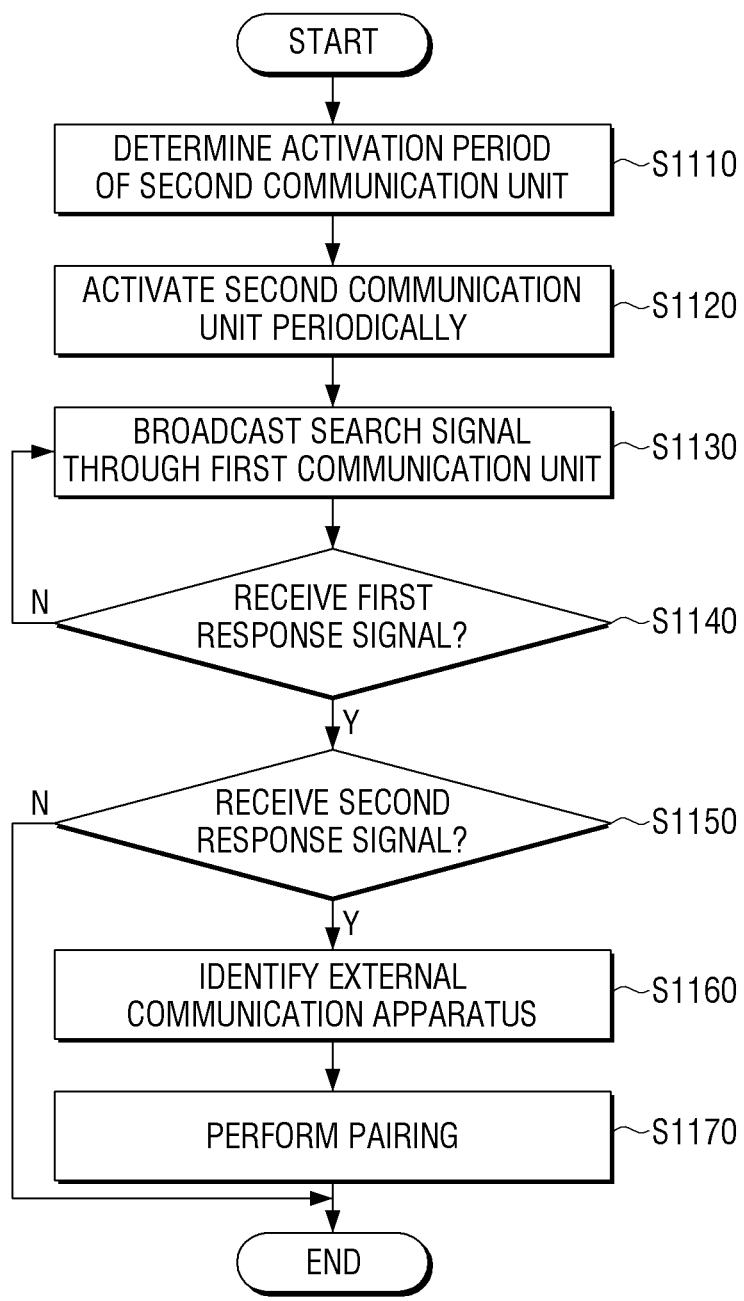

FIGS. 11 and 12 are flowcharts illustrating a method for pairing of a pairing apparatus according to one or more other exemplary embodiments.

FIG. 11 is a flowchart illustrating a method for performing a pairing using transmission period information of the second response signal which is pre-stored in a pairing apparatus.

Referring to FIG. 11, an activation period of the second communication unit is determined (operation S1110). According to the determined activation period, the second communication unit is activated periodically (operation S1120). A search signal is broadcasted through the first communication unit (operation S1130). Herein, when the first response signal is received (operation S1140:Y), whether the second response signal is received is determined (operation S1150). When the first response signal is not received (operation S1140:N), a process of broadcasting a search signal through the first communication unit is repeatedly performed. When the second response signal is received (operation S1150:Y), an external communication apparatus is identified using apparatus identification information included in the second response signal (operation S1160). When the second response signal is not received (operation S1150:N), it is determined that the external communication apparatus that transmits the first response signal is not in the same location, and a pairing is not performed. Then, a pairing with an identified external communication apparatus is performed (operation S1170).

FIG. 12 is a flowchart illustrating a method for performing a pairing using transmission period information of the second response signal included in the first response signal.

Referring to FIG. 12, a search signal is broadcasted through the first communication unit (operation S1210). When the first response signal is received (operation S1220: Y), an activation period of the second communication unit is determined using transmission period information of the second response signal included in the first response signal. When the first response signal is not received (operation S1220:N), a process of broadcasting a search signal through the first communication unit is performed repeatedly. According to a determined activation period, the second communication unit is activated periodically (operation S1240). When the second response signal is received (operation S1250:Y), the external communication apparatus is identified using apparatus identification information including the second response signal (operation S1260). When the second response signal is not received (operation S1250:N), it is determined that the external communication apparatus that transmits the first response signal is not in the same location, and a pairing is not performed. A pairing with the identified external communication apparatus is performed with the identified external communication apparatus (operation S1270).

According to one or more exemplary embodiments, a pairing may be performed automatically by minimizing a user's intervention and a power consumption and by searching communication apparatuses in a limited location.

A pairing method according to one or more exemplary embodiments may be realized as a program and be stored in any of various recording media. That is, a computer program which is processed by any of various processors and/or capable of executing any of various methods described above may be used as it is stored in the record medium.

As an example, a non-transitory computer readable medium which performs a process of broadcasting a search signal for a pairing of an RF communication method through the first communication unit and activating the second communication unit of a pairing apparatus periodically while the pairing apparatus is turned on, and a process of performing a pairing with an external apparatus if the first communication unit receives the first response signal regarding a search signal from the external communication apparatus, and the second communication unit receives the second response signal which is conveyed over a limited location where an external communication apparatus is located, sets an activation period of the second communication unit adaptively according to a transmission period of the second response signal so that a section of the sections where the second communication unit is activated overlaps with a section where the second response signal is transmitted, may be provided.

A non-transitory readable medium may be a medium which stores a data semi-permanently and is readable by an apparatus, or a media which stores a data for a short period such as a register, a cache, a memory and so on. For example, a compact disc (CD), a digital versatile disc (DVD), a hard disk, a Blu-ray disk, a universal serial bus (USB) drive, a memory card, and a ROM may be a non-transitory readable medium.

Various exemplary embodiments were illustrated and explained above. It is understood that one or more other exemplary embodiments are not limited thereto. Also, the description of exemplary embodiments is intended to be illustrative, and not to limit the scope of the claims, and it would be appreciated by those skilled in the art that changes may be made to exemplary embodiments without departing from the principles and spirit of the invention, the scope of which is defined in the appended claims.

What is claimed is:

1. A method for pairing a pairing apparatus comprising a first communicator and a second communicator, the method comprising:
   broadcasting, through the first communicator of the pairing apparatus, a search signal for pairing of the pairing apparatus and an external communication apparatus over a first communication method, and periodically activating the second communicator of the pairing apparatus while the pairing apparatus is turned on; and
   in response to the first communicator receiving, from the external communication apparatus, a first response signal regarding the search signal, and the second communicator receiving, from the external communication apparatus, a second response signal via a second communication method having a shorter transmission range than the first communication method, performing a pairing with the external communication apparatus,
   wherein an activation period of the second communicator is set adaptively according to a transmission period of the second response signal so that at least one time period when the second communicator is activated overlaps with a time period when the second response signal is transmitted.

2. The method as claimed in claim 1, wherein the second response signal comprises apparatus identification information regarding the external communication apparatus, the pairing is performed according to the apparatus identification information, and the apparatus identification information comprises at least one of a personal identification number (PIN), a device identifier (ID), a universally unique identifier (UUID), and media access control (MAC) address information.

3. The method as claimed in claim 1, wherein the first communication method of the first communicator is different from the second communication method of the second communicator.

4. The method as claimed in claim 3, wherein the first communication method is a radio frequency (RF) communication method, the pairing is performed by the RF communication method, the search signal and the first response signal are transmitted according to the RF communication method, and the second communication method is one of an ultrasonic wave method, a sound wave method, an infrared ray (IR) method, a visible light method, and a near field communication (NFC) method.

5. The method as claimed in claim 1, wherein the performing the pairing comprises:
   in response to a plurality of external communication apparatuses transmitting second response signals in response to the broadcast search signal, outputting, for display, information regarding the plurality of external communication apparatuses; and
   in response to a selection of an external communication apparatus from among the output information, performing the pairing with the selected external communication apparatus.

6. The method as claimed in claim 1, wherein the first response signal comprises transmission period information of the second response signal, and the activation period of the second communicator is set based on the transmission period information of the second response signal comprised in the first response signal.

7. The method as claimed in claim 1, the activation period of the second communicator is set based on a signal transmission period of the external communication apparatus and is pre-stored in the pairing apparatus.

8. The method as claimed in claim 1, wherein the activation period of the second communicator is set adaptively to have a Coprime relation with the transmission period of the second response signal.

9. The method as claimed in claim 1, further comprising, in response to the first communicator receiving, from the external communication apparatus, the first response signal, and the second communicator not receiving, from the external communication apparatus, the second response signal, determining not to perform the pairing with the external communication apparatus.

10. A pairing apparatus, comprising:
    a first communicator configured to broadcast a search signal for pairing the pairing apparatus with an external communication apparatus over a first communication method, and to receive, from the external communication apparatus, a first response signal in response to the search signal;
    a second communicator configured to receive a second response signal via a second communication method having a shorter transmission range than the first communication method; and
    a controller configured to, in response to the first communicator receiving the first response signal and the second communicator receiving the second response signal from the external communication apparatus, control to perform a pairing with the external communication apparatus,
    wherein the second communicator is periodically activated while the pairing apparatus is turned on, and an activation period of the second communicator is set adaptively according to a transmission period of the second response signal so that at least one time period when the second communicator is activated overlaps with a time period when the second response signal is transmitted.

11. The pairing apparatus as claimed in claim 10, wherein the second response signal comprises apparatus identification information regarding the external communication apparatus, the pairing is performed according to the apparatus identification information, and the apparatus identification information comprises at least one of a PIN number, a device ID, a UUID, and MAC address information.

12. The pairing apparatus as claimed in claim 10, wherein the first communicator is configured to broadcast the search signal and receive the first response signal over the first communication method which is different from the second communication method of the second communicator.

13. The pairing apparatus as claimed in claim 12, wherein the first communication method is an RF communication method, the pairing is performed by the RF communication method, the search signal and the first response signal are transmitted according to the RF communication method, and the second communication method is one of an ultrasonic wave method, a sound wave method, an IR method, a visible light method, and an NFC method.

14. The pairing apparatus as claimed in claim 10, further comprising:
    a display configured to, in response to a plurality of external communication apparatuses transmitting second response signals in response to the broadcast search signal, output information regarding the plurality of external communication apparatuses, and the controller is configured to, in response to a selection of an external communication apparatus from among the output information, perform the pairing with the selected external communication apparatus.

15. The pairing apparatus as claimed in claim 10, wherein the first response signal comprises transmission period information of the second response signal, and the activation period of the second communicator is set based on the transmission period information of the second response signal comprised in the first response signal.

16. The pairing apparatus as claimed in claim 10, wherein transmission period information of the second response signal is pre-stored in the pairing apparatus, and the activation period of the second communicator is set based on the pre-stored transmission period information of the second response signal.

17. The pairing apparatus as claimed in one of claim 10, wherein the activation period of the second communicator is set adaptively to have a Coprime relation with the transmission period of the second response signal.

18. A communication apparatus, comprising:
 a first communicator configured to receive, from an external pairing apparatus, a broadcast search signal for pairing the pairing apparatus with the communication apparatus over a first communication method, and to transmit, to the pairing apparatus in response to the received search signal, a first response signal via the first communication method; and
 a second communicator configured to transmit, in response to the received search signal, a second response signal via a second communication method having a shorter transmission range than the first communication method,
 wherein the second response signal comprises apparatus identification information regarding the communication apparatus, the pairing is performed according to the apparatus identification information, and the apparatus identification information comprises at least one of a personal identification number (PIN), a device identifier (ID), a universally unique identifier (UUID), and media access control (MAC) address information.

19. The communication apparatus according to claim 18, wherein the first response signal comprises transmission period information of the second response signal.

* * * * *